United States Patent
McPherson (10) Patent No.: US 7,987,954 B2
(45) Date of Patent: Aug. 2, 2011

(54) HARMONIC DAMPER

(76) Inventor: Matthew A. McPherson, Norwalk, WI (US)

( * ) Notice: Subject to any disclaimer, the term of this patent is extended or adjusted under 35 U.S.C. 154(b) by 1264 days.

(21) Appl. No.: 10/871,214

(22) Filed: Jun. 18, 2004

(65) Prior Publication Data

US 2005/0279598 A1 Dec. 22, 2005

(51) Int. Cl.
*F16F 7/00* (2006.01)
(52) U.S. Cl. .................. 188/379; 267/136; 267/137
(58) Field of Classification Search .......... 188/378, 188/374, 380; 267/136, 137
See application file for complete search history.

(56) References Cited

U.S. PATENT DOCUMENTS

| | | | |
|---|---|---|---|
| 4,156,979 A | 6/1979 | Katsenes | 42/1.06 |
| 4,395,809 A * | 8/1983 | Whiteley | 29/451 |
| 5,655,980 A | 8/1997 | Nashif et al. | 473/520 |
| 5,857,694 A | 1/1999 | Lazarus et al. | |
| 5,964,672 A | 10/1999 | Bianchi | 473/521 |
| 5,984,233 A * | 11/1999 | Snyder et al. | 244/119 |
| 6,007,439 A | 12/1999 | MacKay, Jr. | 473/520 |
| 6,117,028 A * | 9/2000 | You | 473/520 |
| 6,257,220 B1 * | 7/2001 | McPherson et al. | 124/89 |
| 6,382,201 B1 * | 5/2002 | McPherson et al. | 124/89 |
| 6,508,343 B2 * | 1/2003 | Misaji et al. | 188/379 |
| 6,709,352 B1 * | 3/2004 | Albin | 473/520 |
| 6,725,985 B2 * | 4/2004 | Haneishi et al. | 188/379 |
| 2002/0170378 A1 * | 11/2002 | Flum et al. | 74/551.8 |
| 2002/0193168 A1 * | 12/2002 | Hosooka et al. | 464/180 |
| 2003/0177746 A1 * | 9/2003 | Goman et al. | 56/7 |

FOREIGN PATENT DOCUMENTS

| | | | |
|---|---|---|---|
| JP | 401008044 | * | 1/1989 |
| JP | 2003081168 | * | 3/2003 |
| KR | 2004041292 | * | 6/2004 |

OTHER PUBLICATIONS

FASST Company internet product literature/brochure entitled "Anti-Vibration Bar Inserts for Motorcycles", pp. 1-3 dated Sep. 12, 2005, printed from www.fasstco.com.
FASST Company internet product literature/brochure entitled "Project Honda CRF450—Installation of Fasst Company's Anti-Vibration Inserts—Off-Road.com's Ride-Net!", pp. 1-4, dated Sep. 12, 2005; printed from www.off-road.com.

\* cited by examiner

*Primary Examiner* — Bradley T King
(74) *Attorney, Agent, or Firm* — Vidas, Arrett & Steinkraus, P.A.

(57) ABSTRACT

A damper for reducing vibrations present in various portions of small vehicles, other transportation devices and other rolling and/or motorized devices, such as bicycles, motorcycles, lawn mowers, snowblowers and the like, may comprise a resilient member and a weight. The resilient member may mounted to a portion of a device having a surface suitable for engaging and retaining the resilient member therein, and the resilient member may have an inside surface suitable for engaging and retaining the weight.

29 Claims, 9 Drawing Sheets

HARMONIC DAMPER

BACKGROUND OF THE INVENTION

This invention relates to a damper which may be used to reduce vibrations in small vehicles, other transportation devices and other rolling and/or motorized devices, such as bicycles, wagons, motorcycles, jet skis, lawn mowers, snowblowers, all-terrain vehicles and the like.

Vehicles are well known and may be used to transport people and various objects, such as cargo. Vehicles generally require an operator, and typically the operator is supported by the vehicle. Other rolling devices, such as lawn mowers and snowblowers, may perform work and may be controlled by an operator.

Vehicles and other devices may generate or be subject to various vibrations and resonances which may be present throughout the structure of the object. Vibrations may pass from the object to the operator, for example through a control device or grip such as a handle, and also through a seat or other support device in cases where the object supports an operator or passengers. Vibrations may be uncomfortable and/or fatiguing to an operator and passengers. Vibrations passing through a handle or control device may be particularly uncomfortable as the vibrations may be absorbed by the hands and arms of a person in contact with the handle or control device.

It would be desirable to damp vibrations present in various areas of small vehicles, other transportation devices and other rolling and/or motorized devices.

U.S. Pat. Nos. 6,257,220 and 6,382,201 to McPherson et al. discuss vibration dampers as applied to archery bows, and are incorporated herein by reference in their entireties.

All U.S. patents and applications and all other published documents mentioned anywhere in this application are incorporated herein by reference in their entirety.

Without limiting the scope of the invention a brief summary of some of the claimed embodiments of the invention is set forth below. Additional details of the summarized embodiments of the invention and/or additional embodiments of the invention may be found in the Detailed Description of the Invention below.

A brief abstract of the technical disclosure in the specification is provided as well only for the purposes of complying with 37 C.F.R. 1.72. The abstract is not intended to be used for interpreting the scope of the claims.

BRIEF SUMMARY OF THE INVENTION

In one embodiment, a vibration damper for motorized devices may comprise a resilient member and a weight. The resilient member may be mounted to a portion of a motorized device having a surface suitable for engaging and retaining the resilient member therein. The resilient member may have an inside surface suitable for engaging and retaining the weight.

In another embodiment, a bicycle vibration damper may comprise a resilient member and a weight. The resilient member may be mounted to a portion of a bicycle having a surface suitable for engaging and retaining the resilient member therein, and the resilient member may have an inside surface suitable for engaging and retaining the weight.

In another embodiment, a bicycle vibration damper may comprise a weight, a first resilient member and a second resilient member. Each resilient member may have an inside surface suitable for engaging and retaining a portion of the weight. The first resilient member may be mounted to a portion of a bicycle having a surface suitable for engaging and retaining the first resilient member therein. The second resilient member may be mounted to a portion of a bicycle having a surface suitable for engaging and retaining the second resilient member therein.

In another embodiment, an excursion damper may comprise a weight, a first resilient member and a second resilient member. Each resilient member may have an inside surface suitable for engaging and retaining a portion of the weight. The first resilient member may be mounted to a portion of a bicycle having a surface suitable for engaging and retaining the first resilient member therein. The second resilient member may be mounted to a portion of a bicycle having a surface suitable for engaging and retaining the second resilient member therein. The first and second resilient members may be arranged to bias the weight to a nominal position and to temporarily allow the weight to displace in three orthogonal directions with respect to the portion of the bicycle engaging the first resilient member.

In some embodiments, any number of resilient members may be used with a weight to comprise a vibration damper.

In some embodiments, a damper may be mounted within a tubular member such that when the weight is at a nominal position, the central axis of the weight and the central axis of each resilient member correspond with a central axis of the tubular member.

These and other embodiments which characterize the invention are pointed out with particularity in the claims annexed hereto and forming a part hereof. However, for a better understanding of the invention, its advantages and objectives obtained by its use, reference should be made to the drawings which form a further part hereof and the accompanying descriptive matter, in which there are illustrated and described various embodiments of the invention.

BRIEF DESCRIPTION OF THE DRAWINGS

A detailed description of the invention is hereafter described with specific reference being made to the drawings.

DETAILED DESCRIPTION OF THE INVENTION

While this invention may be embodied in many different forms, there are described in detail herein specific preferred embodiments of the invention. This description is an exemplification of the principles of the invention and is not intended to limit the invention to the particular embodiments illustrated.

For the purposes of this disclosure, like reference numerals in the figures shall refer to like features unless otherwise indicated.

Figure 1:
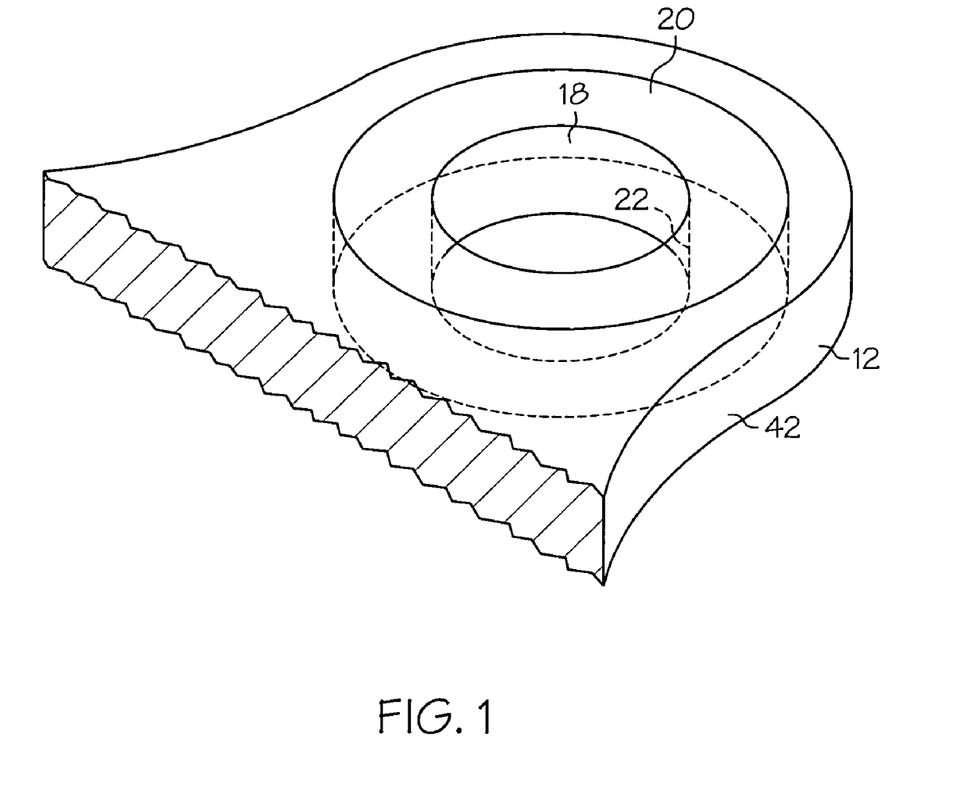
FIG. 1 shows an embodiment of a vibration damper.

FIG. 1 shows an embodiment of a damper 10, which may be mounted to any portion of a small vehicle, other transportation device and other rolling and/or motorized device. The damper 10 may reduce vibrations present in the apparatus 12 to which it is mounted. The damper 10 may be installed in a housing or mount 42, which may comprise a portion of the apparatus 12.

A damper 10 may comprise a weight 18 and a resilient portion or member 20. Desirably, the weight 18 provides a mass that is used by the damper 10 in conjunction with the resilient member 20 to resist movement and/or damp vibrations. The weight 18 may be supported by the resilient member 20 and may deflect with respect to the mount 42. Desirably, the resilient member 20 may bias the weight 18 toward a nominal position. Upon a deflection between the weight 18 and the mount 42, portions of the resilient member 20 may elongate while other portions may compress and/or distend. Inherent resilience of the resilient member 20 may then work to eventually return the weight 18 to the original position.

A weight 18 may have any suitable shape. A resilient member 20 may have any shape that is suitable to support the weight 18. Various embodiments of weights 18 and resilient members 20 may be used to form dampers 10 having varying resonant frequencies and frequency response curves.

The mount 42 or the apparatus 12 desirably includes a surface suitable for engaging and retaining the resilient member 20 therein. The resilient member 20 desirably includes an inside surface suitable for engaging and retaining the weight 18 therein.

The weight 18 may be at least partially supported by the resilient portion 20. In some embodiments, the weight 18 may be entirely supported by the resilient portion 20, and may even be located within the resilient portion 20. The resilient portion 20 may be at least partially supported by the mount 42, and may be entirely supported by the mount 42.

The weight 18 may be formed from any suitable material and is desirably a fairly dense metal such as tungsten, lead, steel, brass, aluminum, and various alloys and combinations thereof. The weight 18 may additionally be formed from non-metals such as plastics, rubbers and the like. In some embodiments, the weight 18 may comprise the same material as the resilient portion 20.

The resilient portion 20 desirably has a greater elasticity than the weight 18. The resilient portion 20 may comprise an elastic or elastomeric material, and may be constructed in whole or in part from a variety of materials including Anylin®, Santoprene®, rubber, plastic, and the like.

In some embodiments, the damper 10 may have a generally cylindrical shape. The weight 18 may be solid, and may also have a cylindrical shape. The resilient portion 20 may be solid, and may have an annular shape. A resilient portion 20 having an annular shape may have a central axis, and may be oriented such that the central axis of the resilient portion is centered upon a central axis of the weight 18.

A damper 10 may be particularly suited to damping shock or vibrations in a damping plane. For example, a resilient portion 20 having an annular shape may have a central axis, and the damping plane of the damper 10 may be orthogonal to the central axis. A damping plane may have a first axis and a second axis.

Figure 2:
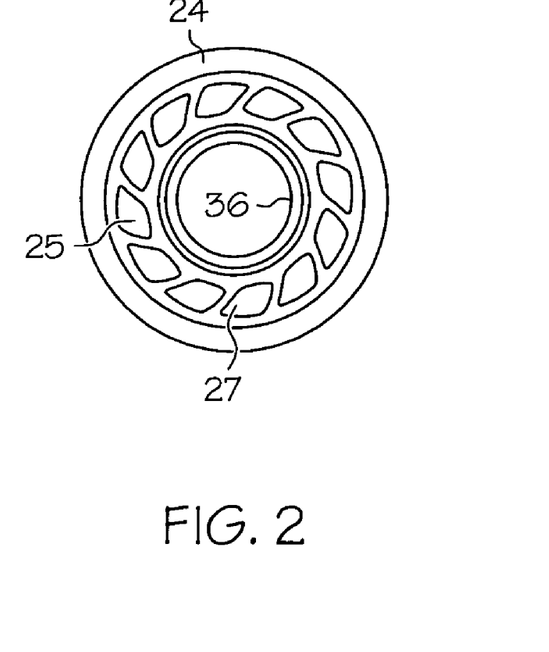
FIG. 2 shows another embodiment of a damper.
Figure 3:
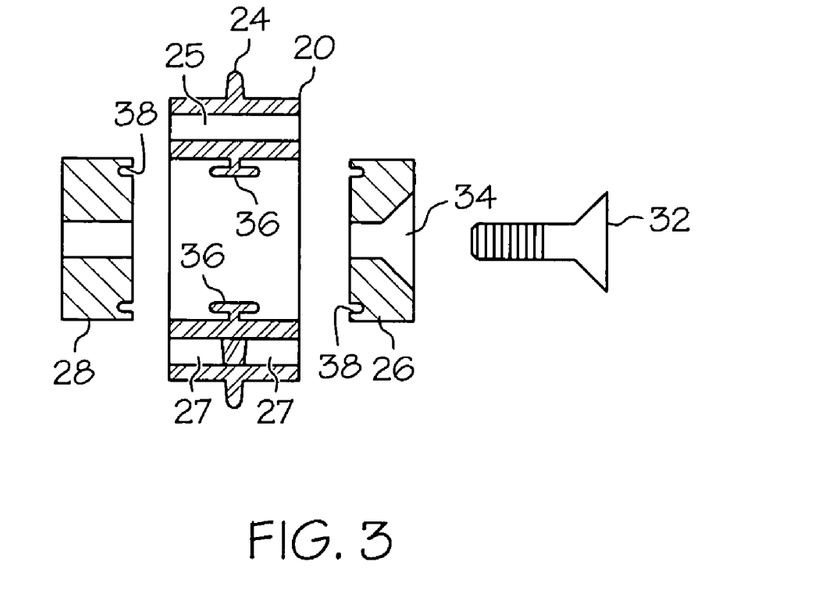
FIG. 3 shows an exploded view of another embodiment of a damper.

FIGS. 2 and 3 show an alternative embodiment of a damper 10. The resilient portion 20 may include one or more apertures 25. The location, size and shape of the apertures 25 in the resilient portion impact the performance characteristics of the damper 10. Apertures 25 may extend through the entire depth of the resilient portion 20. Each aperture 25 may have a longitudinal axis which may be parallel to the central axis of the resilient portion 20. Alternatively, a resilient portion 20 may include cavities 27 which do not extend through the entire depth of the resilient portion 20.

The weight 18 may comprise a plurality of portions which may be secured to one another. FIG. 3 shows a first weight portion 26, a second weight portion 28 and a fastener 32. The resilient portion 20 may further include a mating portion 36 which may help to secure the weight 18 to the resilient portion 20. The first weight portion 26 and the second weight portion 28 may include retaining grooves 38 which may be shaped to receive a mating portion 36. The fastener 32 may extend through the first weight portion 26 and may be attached to the second weight portion 28, thereby securing the weight 18 to the resilient portion 20.

The resilient portion 20 may further include a collar 24 which may provide additional securement to the mount 42. A collar 24 may be formed integrally with the resilient portion 20 or may comprise a separate piece. A collar 24 may be formed from a different material than the resilient portion 20.

Figure 4:
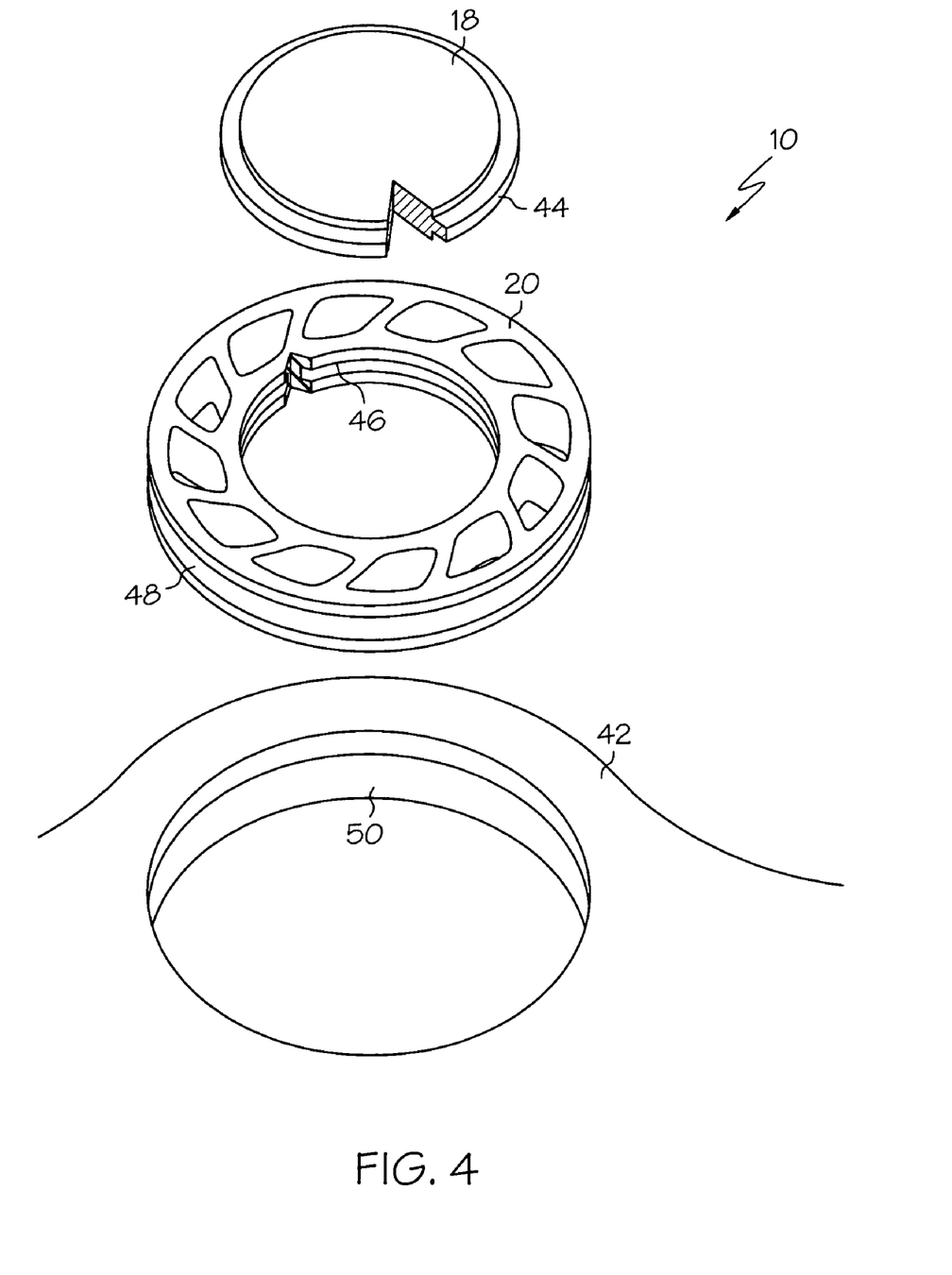
FIG. 4 shows an exploded view of another embodiment of a damper.

FIG. 4 shows another embodiment of a damper 10 according to the present invention. The weight 18 may include a mating portion 44, such as a ridge or flange, and the resilient portion 20 may include a mating portion 46, such as a groove, arranged to receive the mating portion 44 of the weight. The resilient portion 20 may further include another mating portion 48, for example a groove, for securement to the mount 42. Accordingly, the mount 42 may include a mating portion 50, such as a ridge, arranged to receive the mating portion 48 of the resilient member 20.

Figure 5:
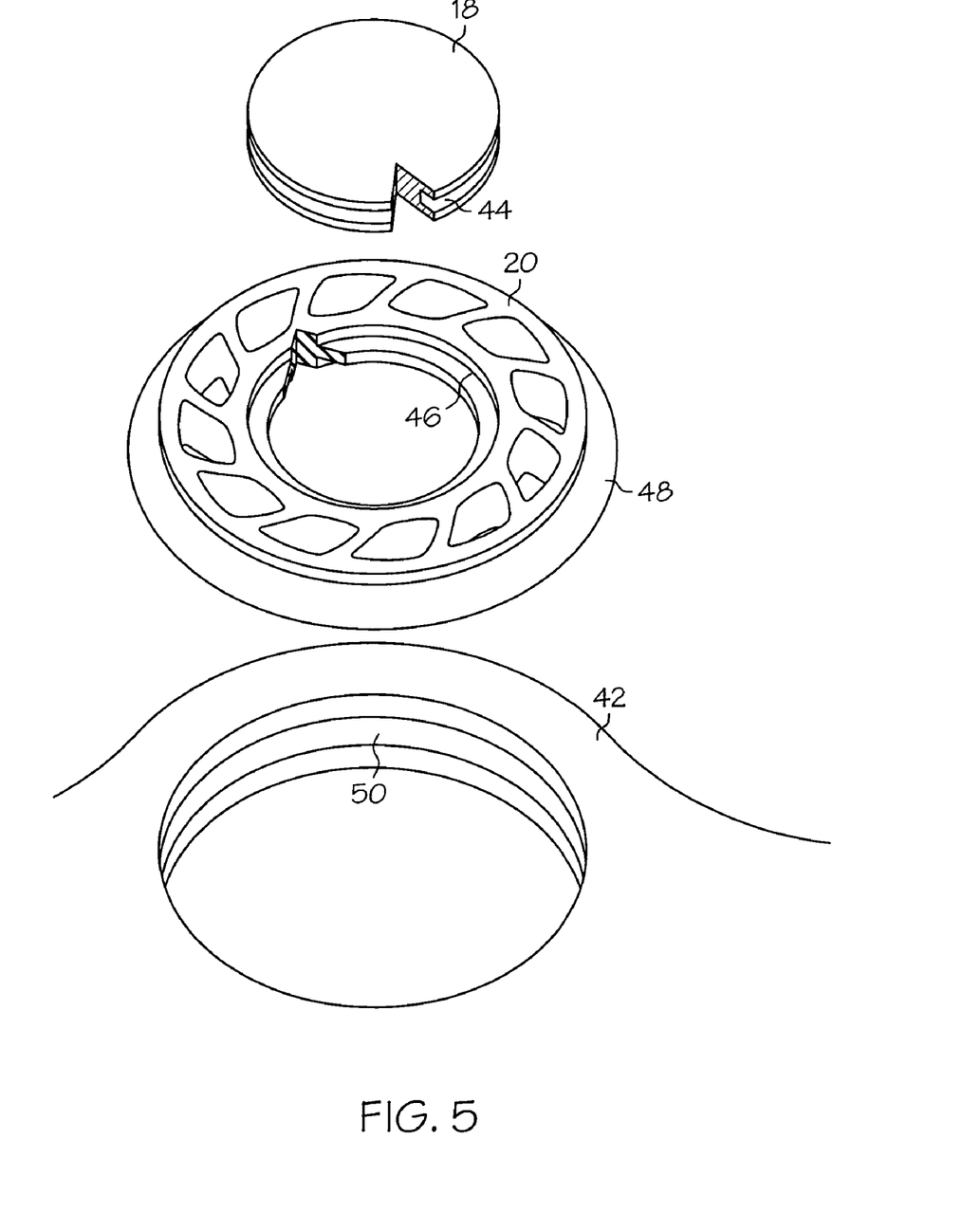
FIG. 5 shows an exploded view of another embodiment of a damper.

FIG. 5 shows another embodiment of a damper 10 according to the present invention. The weight 18 may include a mating portion 44, such as a groove, and the resilient portion 20 may include a mating portion 46, such as a ridge or flange, arranged to receive the mating portion 44 of the weight. The resilient portion 20 may further include another mating portion 48, for example a ridge, for securement to the mount 42, which may include a mating portion 50, such as a groove, arranged to receive the mating portion 48 of the resilient member 20.

It should be noted that the various mating portion embodiments depicted in the Figures are merely examples of configurations which may be used to join the mount 42, resilient portion 20 and weight 18. The configurations shown and described herein are preferred, as they allow a user to remove and replace the various components as desired. Alternative arrangements may include the application of permanent or temporary adhesives as well as other interfacing arrangements. The present invention is directed at these configurations and all other which may be known to one of ordinary skill in the art.

Figure 6:
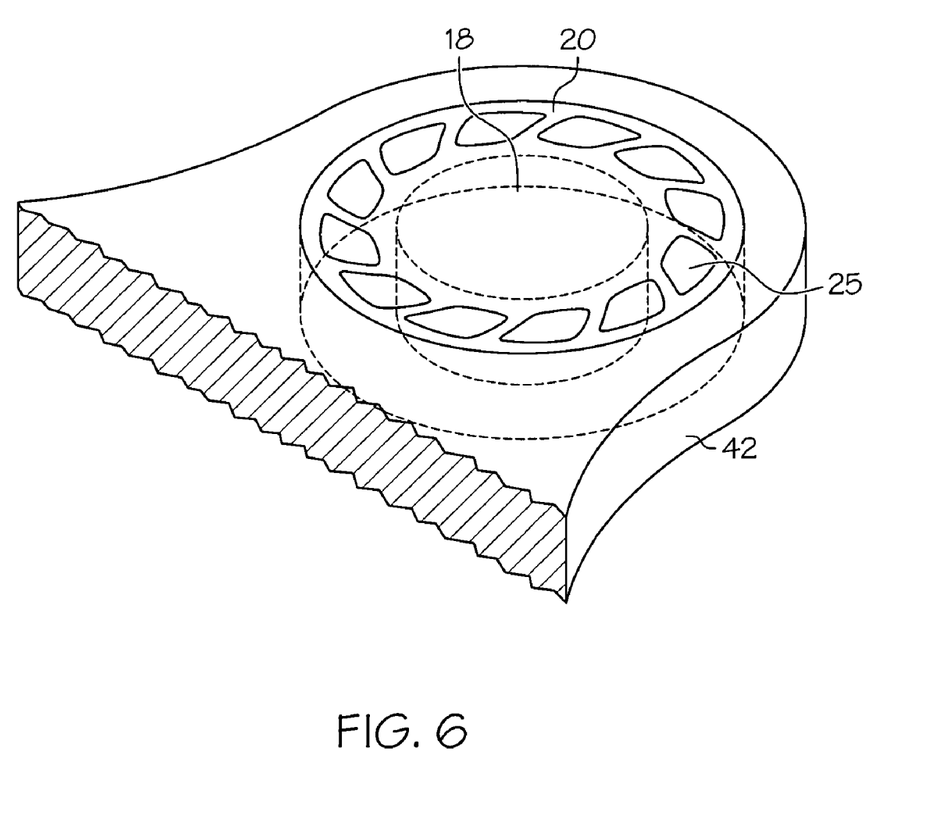
FIG. 6 shows another embodiment of a damper.

FIG. 6 shows another embodiment of a damper 10 according to the present invention. The weight 18 and resilient portion 20 may comprise a single piece of material. Thus, the weight 18 may be integrally formed with the resilient portion 20. The resilient portion 20 may be entirely supported by a mount 42. The resilient portion may include one or more apertures 25 (or cavities 27 as described with respect to FIGS. 2 and 3).

Figure 7:
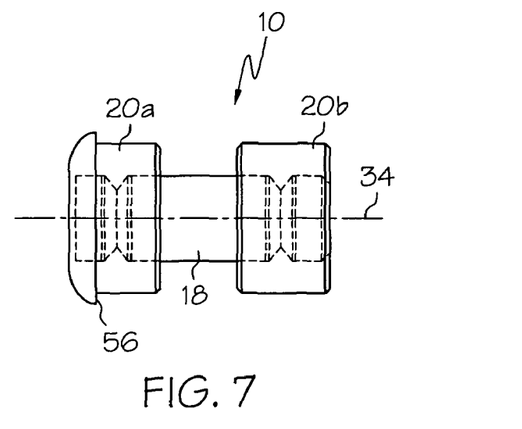
FIG. 7 shows another embodiment of a damper.
Figure 8:
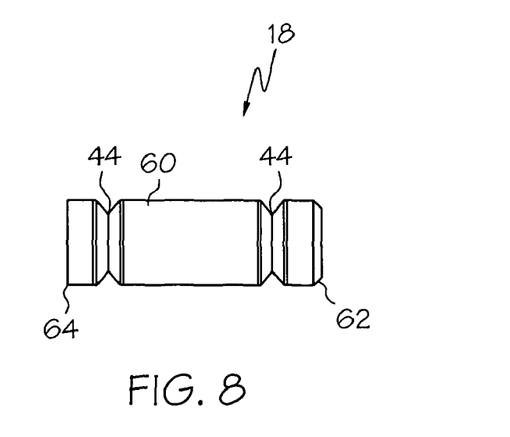
FIG. 8 shows an embodiment of a weight.

FIG. 7 shows another embodiment of a damper 10, which may comprise a weight 18, a first resilient portion 20a and a second resilient portion 20b. The damper 10 may have a longitudinal axis 34. FIGS. 8-10C show the components of the damper 10 in more detail. Referring to FIG. 8, a weight 18 may be cylindrical in shape having a central longitudinal axis. The weight 18 may include an outer surface 60 and may include one or more mating portions 44 extending beneath the outer surface 60. Each mating portion 44 may comprise a recess or groove, and may extend circumferentially about at least a portion of the weight 18. An edge of the weight 18 may comprise a rounded edge 62 or a squared edge 64.

Figure 9A:
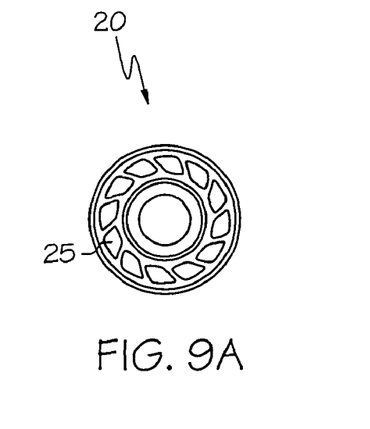
FIGS. 9A and 9B show respective front and side views of an embodiment of a resilient member.
Figure 9B:
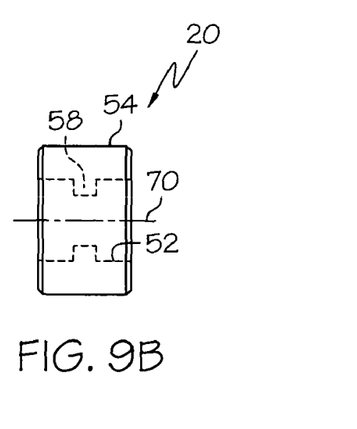

FIG. 9 shows front and side views of an embodiment of a resilient member 20, which may comprise a second resilient member 20b in some embodiments of a damper 10. The resilient member 20 may comprise an annular shape having an inner surface 52, an outer surface 54 and a central axis 70. The resilient member 20 may further include a plurality of apertures 25. Each aperture 25 may have a longitudinal axis which may be parallel to the central axis 70. The resilient member 20 can further include a plurality of spokes, each spoke being located between two adjacent apertures 25. The inner edge 52 may include an internal flange or mating portion 58 which may extend toward the central longitudinal axis. When the resilient member 20 is positioned to support the weight 18, a portion of the outer surface 60 of the weight 18 may abut the inner surface 52 of the resilient member 20. The outer surface 60 of the weight 18 may be frictionally engaged with the inner surface 52 of the resilient member 20. Further, the mating portion 58 of the resilient member 20 may be engaged with the mating portion 44 of the weight 18. For example, the internal mounting flange 58 of the resilient portion 20 may extend into the groove 44 of the weight 18.

Figure 10A:
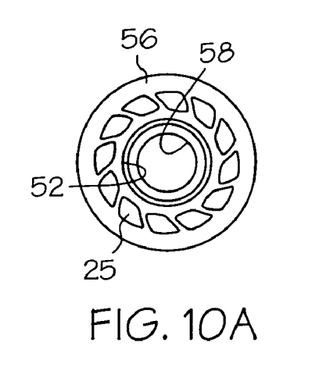
FIGS. 10A-10C show respective front, side and back views of another embodiment of a resilient member.
Figure 10B:
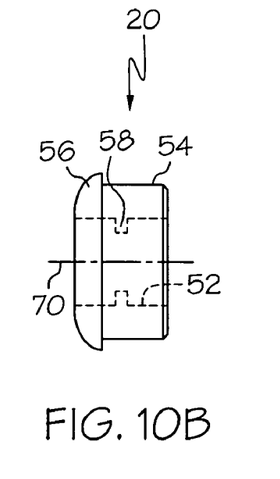
Figure 10C:
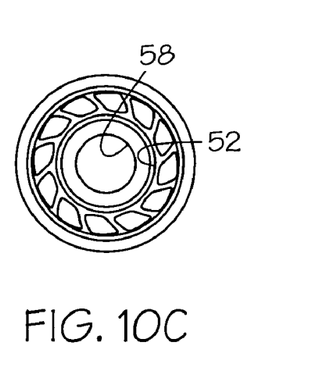

FIGS. 10A-10C show front, back and side views of another embodiment of a resilient portion 20, which may comprise a first resilient member 20a in some embodiments of a damper 10. The resilient member 20 may include the features of other resilient portions described herein, and may also include a mounting flange 56 which may extend a greater radial distance from the central longitudinal axis than the outer edge 54. The mounting flange 56 may abut a portion of a mount to which the resilient portion is engaged. For example, when the damper 10 is installed within a tubular member or mount, the resilient member 20 may be positioned such that the outer surface 54 of the resilient member 20 abuts an inner surface of the tubular mount. The mounting flange 56 may be positioned to abut an end edge of the tubular mount. The mounting flange 56 may prevent the resilient portion 20, and thus the damper 10, from translocating farther into the tubular mount.

Figure 11A:
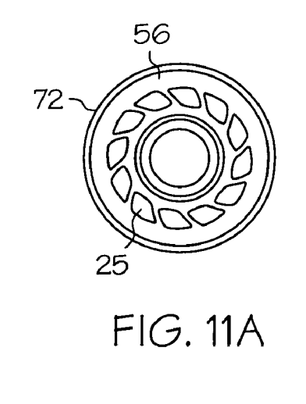
FIG. 11A-11C show respective front, side and back views of another embodiment of a resilient member.
Figure 11B:
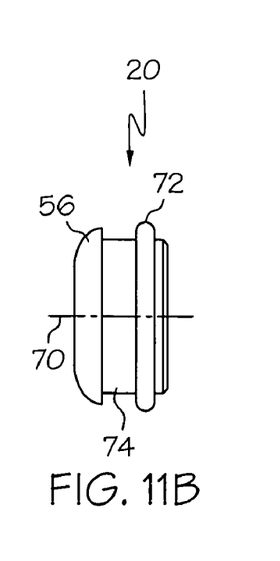
Figure 11C:
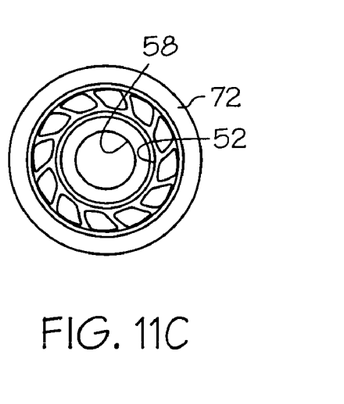

FIGS. 11A-11C show front, back and side views of another embodiment of a resilient portion 20. The resilient member 20 may include the features of other resilient portions described herein, and may also include a frictional engagement flange 72 which may extend from the outer edge 54. In some embodiments, the frictional engagement flange 72 may extend a greater radial distance from the central longitudinal axis than the mounting flange 56. When the resilient member 20 is engaged with a mount, the frictional engagement flange 72 may deform and frictionally engage the mount.

In some embodiments, the space between the frictional engagement flange 72 and the mounting flange 56 may comprise a mating portion or channel 74. The channel 74 may receive an appropriate mating portion of a mount.

In other embodiments, a damper 10 may comprise a weight 18 and any number of resilient members 20. Any suitable embodiment(s) of resilient members 20 may be used in a damper 10. The weight 18 may include a mating portion 44 for each resilient member 20. The resilient members 20 may be spaced along the length of the weight 18. For example, three, four or five or more resilient members 20 may be used with a single weight 18.

Figure 12:
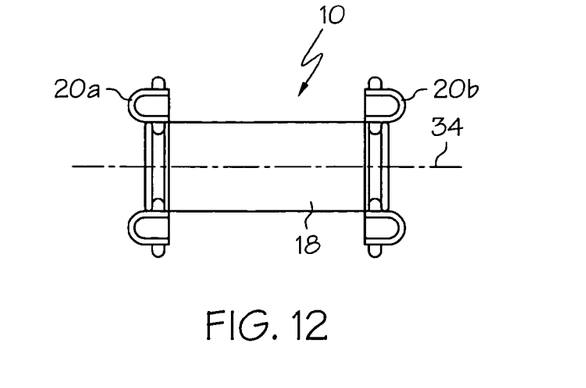
FIG. 12 shows another embodiment of a damper.

FIG. 12 shows another embodiment of a damper 10, which may comprise a weight 18, a first resilient portion 20a and a second resilient portion 20b. The first resilient portion 20a and the second resilient portion 20b may be similarly shaped and may be oriented in opposite directions. The damper 10 may have a longitudinal axis 34. The weight 18 may displace with respect to the resilient members 20 in directions orthogonal to the longitudinal axis 34. The damper 10 may further comprise an excursion damper 10, wherein the weight may displace with respect to the resilient members 20 in directions parallel to the longitudinal axis 34.

Figure 13:
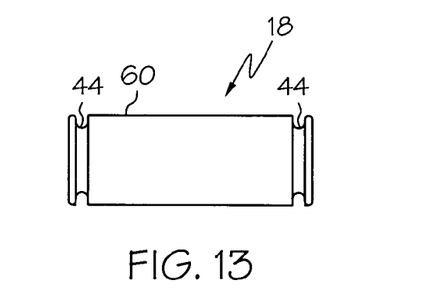
FIG. 13 shows another embodiment of a weight.

FIG. 13 shows a weight 18 in more detail. The weight 18 may be cylindrical in shape and may have a central longitudinal axis. The weight 18 may include an outer surface 60 and may include one or more mating portions 44 extending beneath the outer surface 60. Each mating portion 44 may comprise a recess or groove, and may extend circumferentially about at least a portion of the weight 18.

Figure 14A:
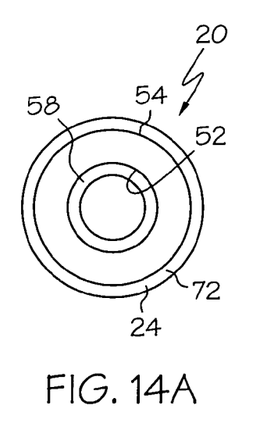
FIGS. 14A-14C show respective front, side sectional and rear views of an embodiment of a resilient member.
Figure 14B:
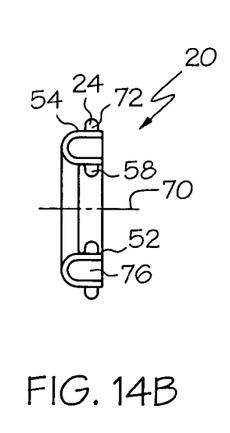
Figure 14C:
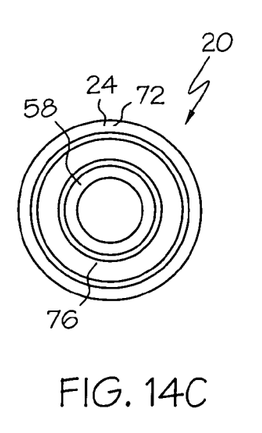

FIGS. 14A-14C show front, sectional and back views of an embodiment of a resilient portion or member 20. The resilient member 20 may comprise an annular shape having an inner surface 52, an outer surface 54 and a central axis 70. The resilient member 20 may include an annular channel 76, which may extend about the longitudinal axis 70 and may have a U-shaped cross-section. The vertical axis of the U-shape may be oriented in a direction parallel to the longitudinal axis 34 of the damper 10. The annular channel 76 may provide added compliance in directions parallel to the central axis 70. Thus, a weight 18 that is engaged with the resilient member 20 may move in directions parallel to the central axis 70.

The inner edge 52 may include an internal flange or mating portion 58 which may extend toward the central axis 70. The resilient member 20 may include a collar 24 and/or a frictional engagement flange 72 which may extend from the outer edge 54. When the resilient member 20 is engaged with a mount, the frictional engagement flange 72 may deform and frictionally engage the mount.

When the resilient member 20 is positioned to support the weight 18, a portion of the outer surface 60 of the weight 18 may abut the inner surface 52 of the resilient member 20. The outer surface 60 of the weight 18 may be frictionally engaged with the inner surface 52 of the resilient member 20. Further, the mating portion 58 of the resilient member 20 may be engaged with the mating portion 44 of the weight 18. For example, the internal mounting flange 58 of the resilient portion 20 may extend into the groove 44 of the weight 18. The central axis 70 of each resilient member 20 and a central axis of a cylindrical weight 18 may all correspond with the longitudinal axis 34 (see FIG. 12) of the damper 10 when the weight 18 is in a nominal position. Upon displacement of the weight 18 with respect to any resilient portion 20, the weight 18 may move in directions orthogonal to the longitudinal axis 34 or parallel to the longitudinal axis 34.

In other embodiments, an excursion damper 10 may comprise a weight 18 and any number of resilient members 20. Any suitable embodiment(s) of resilient members 20 may be used in an excursion damper 10. The weight 18 may include a mating portion 44 for each resilient member 20. The resilient members 20 may be spaced along the length of the weight 18. For example, three, four or five or more resilient members 20 may be used with a single weight 18 to comprise a damper 10.

Figure 15:
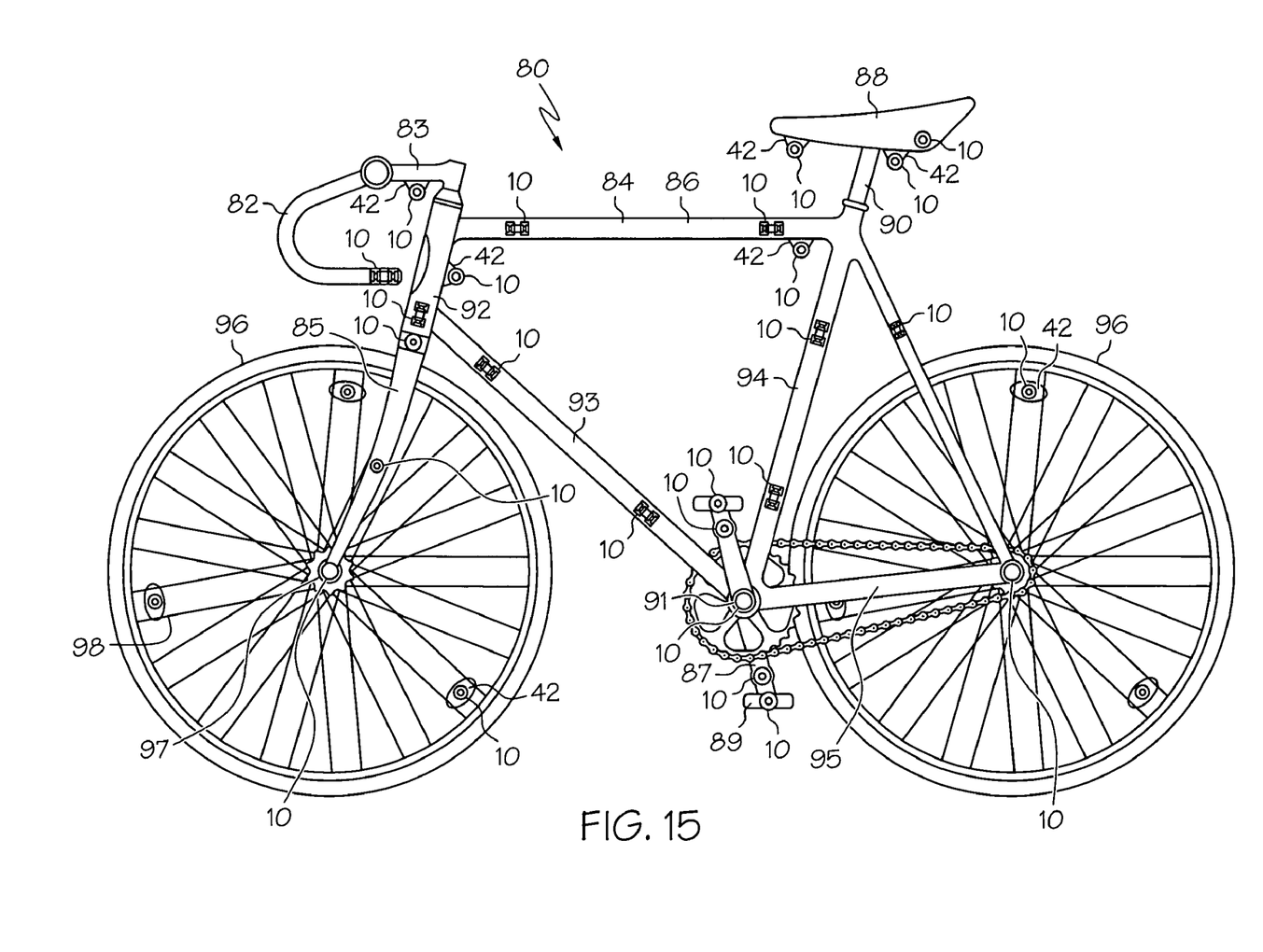
FIG. 15 shows a bicycle with a plurality of vibration dampers.

FIG. 15 shows a bicycle 80 and a number of inventive dampers 10, illustrating some examples of damper placement. A damper 10 may be mounted to any portion of a bicycle 80. A damper 10 may be mounted directly to a component of the bicycle 80, or may be mounted to a mount 42, and the mount may be attached to a component of the bicycle 80. A damper 10 may be mounted within a tubular member of the bicycle 80, such as the frame 84, and may thus be concealed from view. When a damper 10 is mounted within a tubular member, the damper 10 may be oriented such that when the weight 18 is at a nominal position, the central axis of the weight 18 and the central axis 70 of each resilient member correspond with a central axis of the tubular member. Any number of resilient members 20 may be used in conjunction with a weight 18 to form a damper 10. For example, a weight 18 may be dimensioned to span a substantial portion of a frame 84 member, such as the top tube 86. Any number of resilient members 20 may be used to support the weight 18 within the top tube 86. The resilient members 20 may be spaced at any suitable interval. When dampers 10 are mounted within a tubular member, desirably at least two resilient members 20, such as the resilient members 20 located closest to either end of the weight 18, include a frictional engagement flange 72 (see FIG. 11).

In some embodiments, a damper 10 may be mounted within a portion of a bicycle component. For example, a handlebar 82 may comprise a tubular member. A damper 10 may be mounted within a portion of the handlebar 82. For example, a damper 10 according to FIG. 7 may be installed at either end of the handlebar 82. The central axis of the damper may correspond with a central axis of the handlebar 82 along the length of the damper 10. A mounting flange 56 of a resilient member 20 may abut an end portion of the handlebar 82.

Inventive dampers 10 may be mounted to the surface of or within a seat 88 and/or seat post 90. Dampers 10 may be mounted to or within any portion of the frame 84, including the top tube 86, the head tube 92, the down tube 93, the seat tube 94 and/or the chain stays 95. Dampers 10 may be mounted to or within a handlebar 82, a stem 83, a fork 85, a crank arm 87, a pedal 89 and/or a bottom bracket 91. Dampers 10 may be mounted to or within a portion of a wheel 96, hubset 97 and/or a spoke or spokes 98. In some embodiments, a mount 42 may be attached to multiple spokes 98, and a damper 10 may be installed in the mount 42.

In some embodiments, dampers 10 may be used in motorized devices having a handlebar and at least two wheels. Dampers 10 may be mounted to or within a portion of a handlebar, a frame and/or any part of the wheels.

The above disclosure is intended to be illustrative and not exhaustive. This description will suggest many variations and alternatives to one of ordinary skill in this field of art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A bicycle vibration damper comprising:
   a first resilient member, a second resilient member and a weight;
   wherein each resilient member is mounted to a portion of the bicycle, each resilient member comprises an inner circumference suitable for engaging and retaining the weight, the first resilient member further comprises a plurality of cavities, the cavities spiced around a central axis of the first resilient member, each cavity extending in a direction parallel to the central axis, wherein the weight contacts the inner circumference of each resilient member.

2. The bicycle vibration damper of claim 1, wherein at least a portion of at least one resilient member is made of rubber.

3. The bicycle vibration damper of claim 1, wherein at least a portion of the weight is made of tungsten, aluminum or brass.

4. The bicycle vibration damper of claim 1, wherein the weight is entirely supported by the resilient members.

5. The bicycle vibration damper of claim 1, wherein at least one resilient member is mounted to a handlebar.

6. The bicycle vibration damper of claim 1, wherein the inner circumference of at least one resilient member includes a raised flange, and the weight includes a recess arranged to mate with said raised flange.

7. The bicycle vibration damper of claim 1, wherein at least one resilient member is mounted within a tubular member of the bicycle.

8. The bicycle vibration damper of claim 1, wherein the first resilient member further comprises a plurality of spokes, each spoke located between two adjacent cavities.

9. The bicycle vibration damper of claim 1, wherein at least one resilient member is mounted to a bicycle frame.

10. The bicycle vibration damper of claim 9, wherein the damper is concealed within the bicycle frame.

11. The bicycle vibration damper of claim 1, wherein the second resilient member further comprises a plurality of cavities, the cavities spaced around a central axis of the second resilient member, each cavity extending in a direction parallel to the central axis of the second resilient member.

12. The bicycle vibration damper of claim 1, wherein at least one resilient member is mounted to a wheel.

13. The bicycle vibration damper of claim 12, further comprising a mount coupled to a wheel spoke, the mount arranged to support the resilient members.

14. A bicycle vibration damper comprising:
   a weight;
   a first resilient member having an inner cavity and a plurality of apertures distributed around the inner cavity, each aperture extending in a direction parallel to a central axis of the first resilient member; and a second resilient member having an inner cavity;
wherein the first resilient member is mounted to a portion of a bicycle having a surface suitable for engaging and retaining, the first resilient member therein, the second resilient member is mounted to a portion of a bicycle having a surface suitable for engaging and retaining the second resilient member therein, a first portion of the weight is oriented within the inner cavity of the first resilient member and a second portion of the weight is oriented within the inner cavity of the second resilient member.

15. The bicycle vibration damper of claim 14, wherein the weight is entirely supported by the first resilient member and the second resilient member.

16. The bicycle vibration damper of claim 14, wherein the inner cavity of the first resilient member includes a first internal flange, the inner cavity of the second resilient member includes a second internal flange, and the weight includes a first recess arranged to mate with said first internal flange and a second recess arranged to mate with said second internal flange.

17. The bicycle vibration damper of claim 14, wherein the first resilient member comprises an annular shape having a central axis, the second resilient member comprises an annular shape having a central axis, and the weight comprises a cylindrical shape having a longitudinal axis; wherein the central axes of the first and second resilient members are centered upon the longitudinal axis of the weight.

18. The bicycle vibration damper of claim 14, wherein the second resilient member further comprises a plurality of apertures distributed around the inner cavity, each aperture extending in a direction parallel to a central axis of the second resilient member.

19. The bicycle vibration damper of claim 14, wherein the first resilient member includes a mounting flange arranged to abut the portion of the bicycle engaging and retaining the first resilient member.

20. The bicycle vibration damper of claim 19, wherein the damper is mounted within a portion of a handlebar, the mounting flange of the first resilient member abutting an end of the handlebar.

21. The bicycle vibration damper of claim 14, wherein the first resilient member further comprises a plurality of spokes, each spoke located between two adjacent apertures.

22. The bicycle vibration damper of claim 18, wherein the second resilient member further comprises a plurality of spokes, each spoke located between two adjacent apertures.

23. The bicycle vibration damper of claim 14, further comprising a third resilient member having an inside surface suitable for engaging and retaining a portion of the weight, the third resilient member mounted to a portion of a bicycle having a surface suitable for engaging and retaining the third resilient member therein.

24. The bicycle vibration damper of claim 23, wherein the first, second and third resilient members are equally spaced along the length of the weight.

25. An excursion damper comprising:
a weight;
a first resilient member having an inner cavity and a plurality of apertures distributed around the inner cavity, each aperture extending through an entire height dimension of the first resilient member; and
a second resilient member having an inner cavity;
wherein the first resilient member is mounted to a portion of a bicycle having a surface suitable for engaging and retaining the first resilient member therein; the second resilient member is mounted to a portion of a bicycle having a surface suitable for engaging and retaining the second resilient member therein; a first portion of the weight is oriented within the inner cavity of the first resilient member and a second portion of the weight is oriented within the inner cavity of the second resilient member; the first and second resilient members arranged to bias the weight to a nominal position and to temporarily allow the weight to displace in three orthogonal directions with respect to the portion of the bicycle engaging the first resilient member.

26. The excursion damper of claim 25, wherein the first resilient member further comprises a plurality of spokes, each spoke located between two adjacent apertures.

27. The excursion damper of claim 26, wherein the second resilient member further comprises a plurality of apertures distributed around the inner cavity, each aperture extending through an entire height dimension of the second resilient member.

28. The excursion damper of claim 25, further comprising a third resilient member having an inside surface suitable for engaging and retaining a portion of the weight, the third resilient member mounted to a portion of a bicycle having a surface suitable for engaging and retaining the third resilient member therein.

29. The excursion damper of claim 28, further comprising a fourth resilient member having an inside surface suitable for engaging and retaining a portion of the weight, the fourth resilient member mounted to a portion of a bicycle having a surface suitable for engaging and retaining the fourth resilient member therein.

* * * * *